US006609847B1

United States Patent
Wang

(10) Patent No.: US 6,609,847 B1
(45) Date of Patent: Aug. 26, 2003

(54) WATER INLET CONTROL MECHANISM

(75) Inventor: King-Yuan Wang, Changhua Hsien (TW)

(73) Assignee: Yuan Mei Corp., Changhua Hsien (TW)

( * ) Notice: Subject to any disclaimer, the term of this patent is extended or adjusted under 35 U.S.C. 154(b) by 0 days.

(21) Appl. No.: 10/349,215

(22) Filed: Jan. 23, 2003

(51) Int. Cl.[7] ............................................. A46B 11/06
(52) U.S. Cl. ..................... 401/137; 15/144.4; 15/172; 15/176.2; 15/176.3; 239/532; 239/587.1; 285/302; 401/277; 401/281; 401/289; 403/351
(58) Field of Search ................................ 401/137, 277, 401/281, 280, 270, 289; 15/144.4, 172, 176.2, 176.3; 239/532, 587.1; 285/302; 403/351

(56) References Cited

U.S. PATENT DOCUMENTS

| | | | | |
|---|---|---|---|---|
| 1,373,369 A | * | 3/1921 | Trial | 401/137 |
| 5,336,012 A | * | 8/1994 | Newville | 401/289 |
| 5,584,594 A | * | 12/1996 | Newville | 401/289 |
| 6,164,496 A | * | 12/2000 | Gregory | 239/316 X |
| 6,336,764 B1 | * | 1/2002 | Liu | 401/289 |

* cited by examiner

Primary Examiner—Gregory L. Huson
Assistant Examiner—Kathleen J. Prunner
(74) Attorney, Agent, or Firm—Troxell Law Office PLLC

(57) ABSTRACT

A water inlet control mechanism for cleaning brushes has a brush embodiment, a telescopic tube, a valve assembly, and a rotary connector wherein the brush embodiment having a through groove for a scraper strip to be adapted thereto is attached to one end of the telescopic tube. The valve assembly sleeve joined to an outer tube of the telescopic tube is mainly made up of a valve body, a valve sleeve and a switch sleeve. The valve sleeve adapted to a transverse retaining hole of the valve body has a sealing ring abutting against a projecting flange of the valve body to seal up the discharge of water, and two arc ends located onto an eccentric arc facet of the switch sleeve via a guide slope for regulating the water discharge. The switch sleeve is rotated to one side to dislocate the sealing ring thereof from the projecting flange thereof via the eccentric arc facet pushing both arc ends thereof to reveal a gap there-between for the discharge of water. When the gap thereof becomes wider, the amount of water discharged will increase accordingly. Thus, via the mechanism thereof, the switch sleeve can directly regulate the discharge of water without any counter force produced therewith as well as accurately control the amount of water discharged, greatly saving the strength thereof.

2 Claims, 6 Drawing Sheets

WATER INLET CONTROL MECHANISM

BACKGROUND OF THE INVENTION

The present invention is related to a water inlet control mechanism for cleaning brushes, comprising a brush embodiment, a telescopic tube, a valve assembly, and a rotary connector wherein said brush embodiment is attached to one end of said telescopic tube thereof. The valve assembly sleeve joined to an outer tube of said telescopic tube is mainly made up of a valve body, a valve sleeve and a switch sleeve. The valve sleeve adapted to a transverse retaining hole of the valve body has a sealing ring abutting against a projecting flange of the valve body, and two arc ends located at an eccentric arc facet of the switch sleeve via a guide slope. Via the mechanism thereof, the switch sleeve thereof can easily regulate the discharge of water as well as accurately control the amount of water discharged.

Please refer to FIG. 1. A conventional water inlet control mechanism for a sprinkler 4 is mainly made up of a sprinkler body 41, a valve body 42, a sealing washer 43, a pivot body 44, a water filter 45, a sealing rubber 46, and a rotary head 47. The sprinkler body 41 has a transverse through hole 411 disposed at the upper section thereof, a vertical through hole 412 disposed at the middle section thereof in communication with the transverse through hole 411, a retaining hole 413 extending at the front of said transverse through hole 411, and a locating block 414 disposed at the upper section thereof. The valve body 42 is provided with a pair of arc ends 421 disposed at both sides thereof, a sealing ring 422 adapted at each of the arc ends 421 thereof, and a tapered facet 423 disposed at the middle section thereof. The sealing washer 43 has a central through hole 431 with an arc facet 432 disposed at the inner side of said central through hole 431 thereof. The pivot body 44 has a top rod 441, an arc slope 432 extending at the bottom of the rod 441, and a coupling hole 443 disposed at the lower section thereof. The water filter 45 is provided with a plurality of locating plates 451 extending at the top thereof and seat body 452 with a filter hole 453 disposed at the bottom thereof. The rotary head 47 has an eccentric arc facet 471 disposed at the inner side thereof, and locating teeth 472 defining the eccentric arc facet in an arc of 90°.

There are some drawbacks to such conventional water inlet control mechanisms for a sprinkler. First, the rotary head 47 is easily blocked at the sprinkler body 41 therein when the arc ends 421 of the rotary head 47 are adapted to abut against the eccentric arc facet 471 thereof, causing great difficulty in assembly. Second, the pivot body 44, whose top rod 441 is pushed upwards via water pressure to engage with the sealing washer 43 for indirectly sealing the water discharge, may float up and down at the vertical through hole 412 of the sprinkler body 41 therein because of the low water pressure, failing to seal the discharge of water effectively. Third, it's hard for the rotary head 47 to regulate the discharge of water when the top rod 441 pushed upwards via water pressure is constantly counteracted by the tapered facet 423 of the valve body 42 pressing downwards the top rod 44 for water discharge. Accordingly, it's not easy to engage the locating teeth 472 of the rotary head 47 properly with the locating block 414 of the sprinkler body 41 when the rotary head 47 is rotated back and forth for the proper amount of water discharge. Fourth, the tapered facet 423 of said valve body 42 and the top rod 441 of the pivot body 44 are easily worn out of use due to the counter force generated thereof. Fifth, the water discharge is easily interrupted or even blocked by sediment when the sealing washer 43, the pivot body 44, as well as the water filter 45 are all adapted at the sprinkler body 41 therein.

SUMMARY OF THE PRESENT INVENTION

It is, therefore, the primary purpose of the present invention to provide a water inlet control mechanism for cleaning brushes, mainly made up of a valve assembly wherein a valve sleeve adapted to a transverse retaining hole of a valve body has a sealing ring abutting against a projecting flange of the valve body to seal up the discharge of water, and two arc ends located at an eccentric arc facet of a switch sleeve for regulating the water discharge as well as the amount of water discharged. Besides, both arc ends of the valve sleeve are smoothly located onto the eccentric arc facet thereof via a guide slope of the switch sleeve, refraining the valve sleeve from blocking at the switch sleeve therein. The valve assembly is simplified in assembly parts, greatly reducing the cost of production as well as the time of assembly thereof.

It is, therefore, the secondary purpose of the present invention to provide a water inlet control mechanism for cleaning brushes wherein the switch sleeve is rotated to dislocate the sealing ring of the valve sleeve from the projecting flange of the valve body via the eccentric arc facet pushing both arc ends thereof, directly regulating the discharge of water without any counter force produced therewith. Besides, the switch sleeve can accurately control the amount of water discharged, greatly saving the strength thereof.

It is, therefore, the third purpose of the present invention to provide a water inlet control mechanism for cleaning brushes wherein via the movement of the eccentric arc facet thereof, the switch sleeve, locating or dislocating the sealing rings thereof onto or from the projecting flange thereof for the sealing or discharge of water, can directly and smoothly regulate the water discharge without wearing out any parts thereof, greatly increasing the lifetime thereof.

It is, therefore, the fourth purpose of the present invention to provide a water inlet control mechanism for cleaning brushes wherein the water coming through a lower water inlet hole of the valve body will go through the valve sleeve adapted at the sleeve body therein and come out at an upper water outlet hole of the valve body to be discharged out of a brush embodiment via a telescopic tube smoothly without any interruption thereof.

DETAILED DESCRIPTION OF THE PREFERRED EMBODIMENTS

Figure 1:
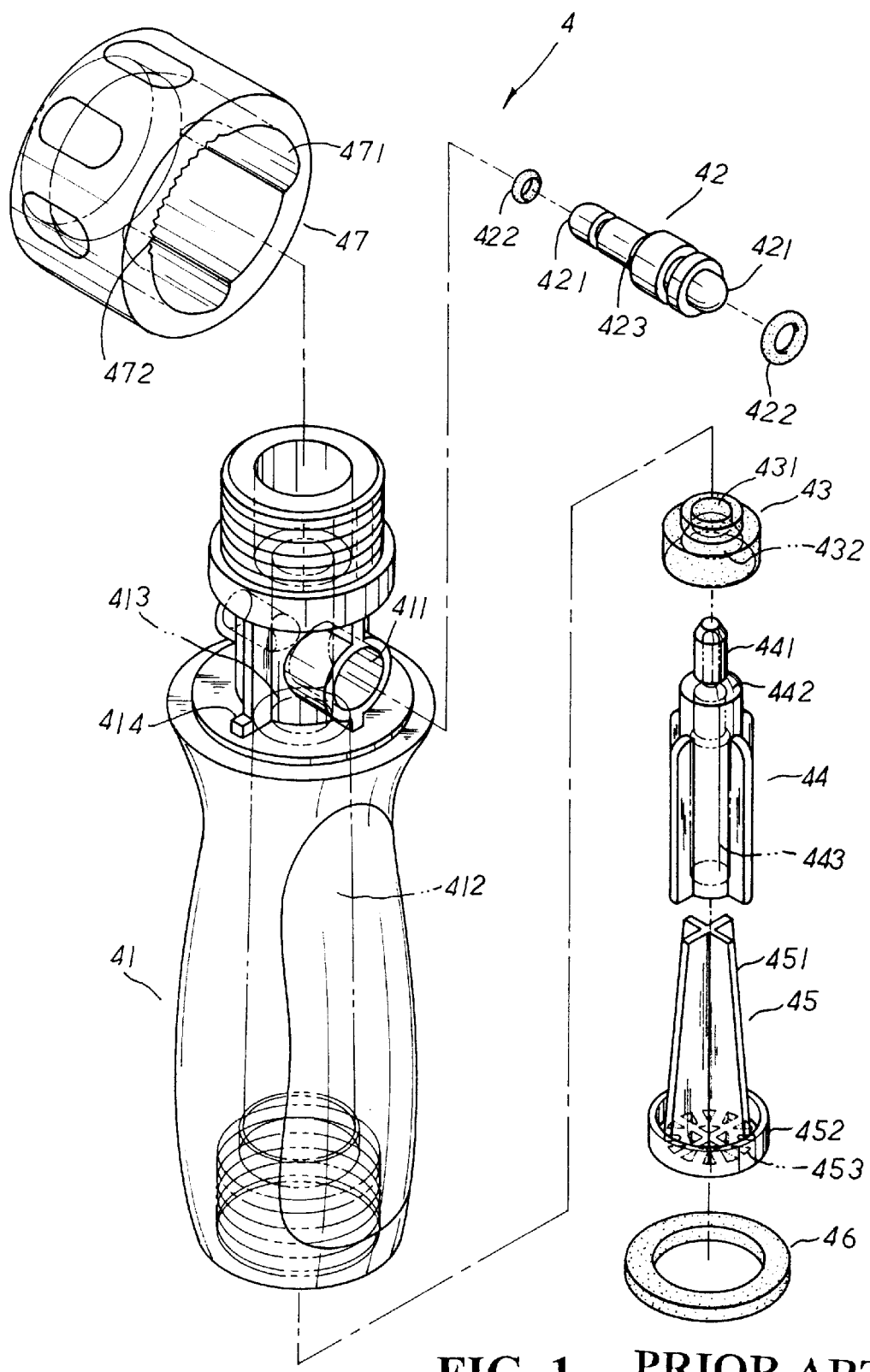
FIG. 1 is a perspective exploded view of a conventional cleaning sprinkler.
Figure 2:
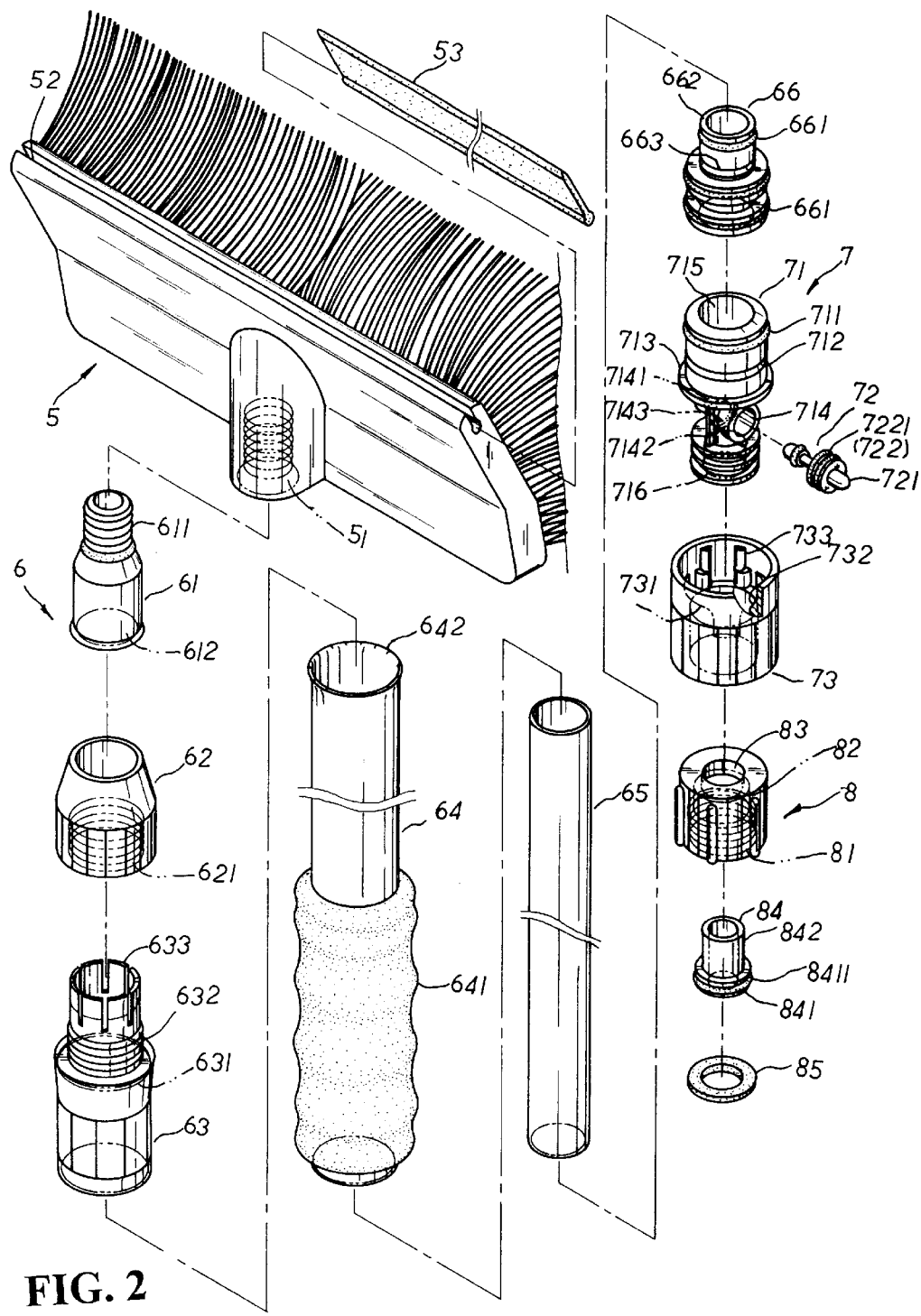
FIG. 2 is a perspective exploded view of the present invention.

Please refer to FIG. 2. The present invention is related to a water inlet control mechanism for cleaning brushes, comprising a brush embodiment 5, a telescopic tube 6, a valve assembly 7, and a rotary connector 8. The brush embodiment 5 has a threaded coupling hole 5 disposed at the center thereof, and a through groove 52 disposed at one lateral side thereof for a scraper strip 53 to be adapted thereto.

The telescopic tube 6, a hollow tube in shape, is mainly made up of a threaded sleeve 61, a locking sleeve 62, a sleeve tube 63, an outer tube 64, an inner tube 65, and a sealing sleeve 66. The threaded sleeve 61 has a threaded upper end 611 of smaller diameter, and a sleeve coupling hole 612 disposed at the lower end thereof. The locking sleeve 62 has an inner threaded section 621 disposed at one end thereof with a tapered section disposed at the other end thereof. The sleeve tube 63 has an inner ring groove 631 properly disposed at the middle section thereof, a stepwise outer threaded section 632 disposed at one end thereof and a plurality of stopping teeth 633 extending upwards at top of the stepwise outer threaded section 632 thereof. The outer tube 64 with the inner tube 65 sleeve joined therein is equipped with a handle cover 641 disposed at the outer surface thereof, and a projecting ring 642 disposed at one end thereof. The sealing sleeve 66 has a plurality of waterproof rings 661 disposed at the periphery thereof, a stepwise coupling tube 662 disposed at one end thereof, and an indented groove 663 disposed at the periphery of the stepwise coupling tube 662 thereof.

The valve assembly 7 is mainly made up of a valve body 71, a valve sleeve 72, and a switch sleeve 73. The valve body 71 is provided with a plurality of watertight rings 711 disposed at both upper and lower periphery thereof, a circular groove 712 defined properly at the upper section thereof, a stop flange 713 projecting at the middle section thereof, and a transverse retaining hole 714 properly disposed at the lower section thereof. A pair of asymmetric and crescent-shaped upper and lower water outlet orifices 7141, 7142 are disposed at the inner side of said transverse retaining hole 714 in communication with an upper water outlet hole 715 and a lower water inlet hole 716 disposed at both end of said valve body 71 thereof respectively. The lower water outlet orifice 7142 is defined by a projecting flange 7143 adjacent to said lower water inlet hole 316 thereof. The valve sleeve 72 is provided with a pair of arc ends 721 disposed at both sides thereof, and an indented ring groove 722 disposed at one side thereof with a sealing ring 7221 adapted thereto. The switch sleeve 73 is equipped with an eccentric arc facet 731 properly disposed at the inner side thereof, a guide slope 732 extending at top of the eccentric arc facet 731 thereof, and a plurality of locating ribs 733 arranged properly at the inner side thereof.

The rotary connector 8 is equipped with an inner threaded hole 81 disposed at the lower section thereof, and a sleeve hole 82 and a pivot hole 83 disposed sequentially in stepwise at top of the inner threaded hole 81 thereof for a retaining sleeve 84 to be led there-through. The retaining sleeve 84 has a sleeve seat 841 with a watertight ring 8411 adapted thereto disposed at one end thereof, and a pivot rod 842 projecting at the other end thereof. A sealing washer 85 is adapted to be abutted against said sleeve seat 841 thereof.

Figure 3:
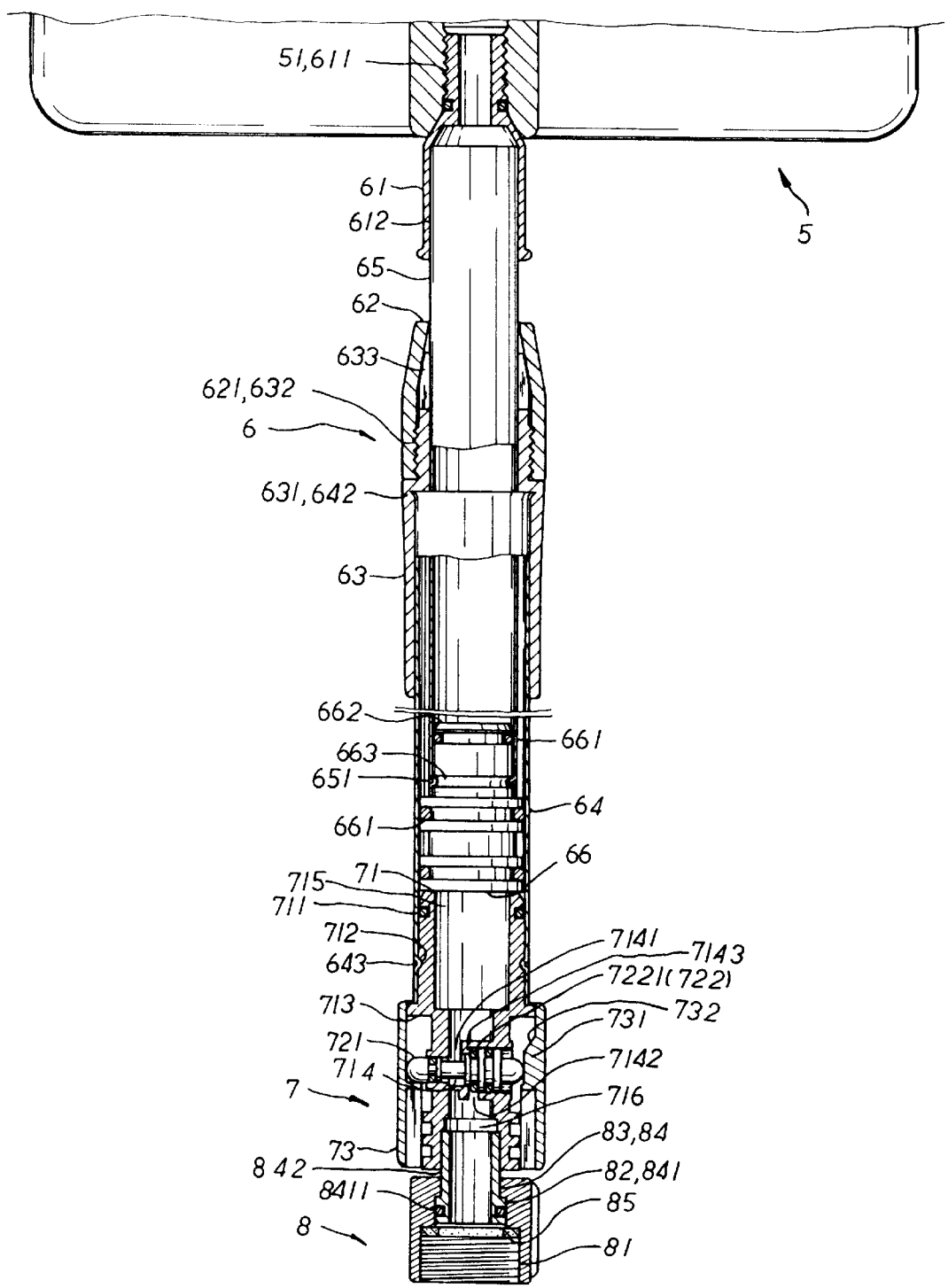
FIG. 3 is a sectional view of the present invention in assembly.

Please refer to FIG. 3. In assembly, the scraper strip 53 is first adapted to the through groove 52 of said brush embodiment 5. The upper end of the outer tube 64 is led upwards and sleeve joined to the inner side of said sleeve tube 63 with the projecting ring 642 thereof fixedly engaged with the inner ring groove 631 thereof. The stepwise coupling tube 662 of the sealing sleeve 66 is sleeve joined to one end of the inner tube 65 and located therein via the indented groove 663 engaging with a plurality of punched retaining dots 651 disposed at the lower periphery of the inner tube 65 thereof. The inner tube 65 is then led through one end of the outer tube 64 to come out at the other end thereof. The locking sleeve 62 is sleeve joined to the upper end of the inner tube 65 with the inner threaded section 621 thereof screw joined to the outer threaded section 632 of the sleeve tube 63, pressing the stopping teeth 633 to clamp tightly against the inner tube 65 for secure location thereof. The upper end of the inner tube 65 is then fixedly engaged with the coupling hole 612 of the threaded sleeve 61 to complete the assembly of the telescopic tube 6 thereof.

Figure 4:
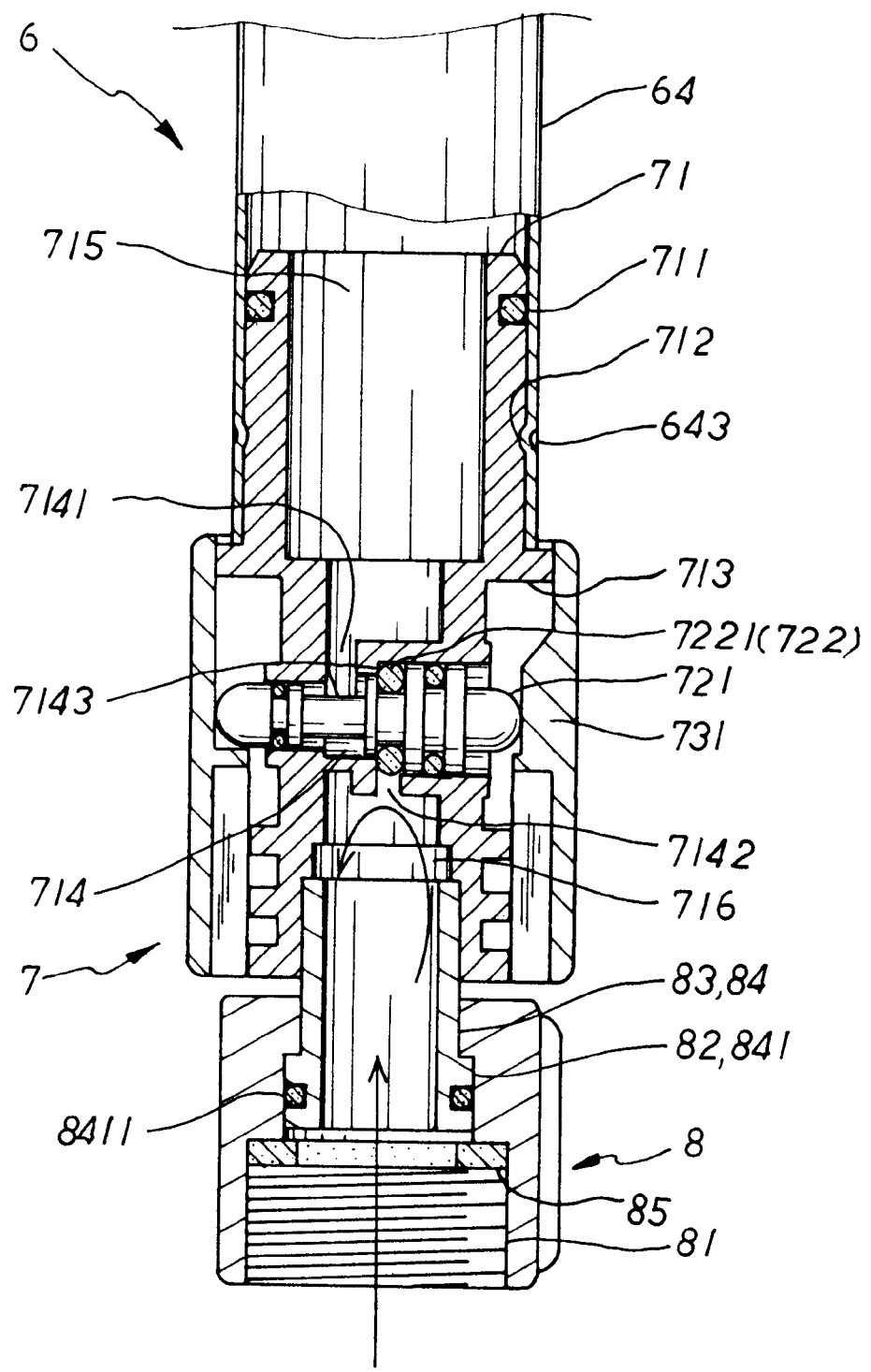
FIG. 4 is a diagram showing the sealing up of water discharge of the present invention in a partially sectional view.

The valve body 71 is led through the lower end of the outer tube 64 and securely sleeve joined therein via the circular groove 712 thereof engaged with a plurality of punched locating dots 643 disposed at the lower periphery of the outer tube 64 thereof. The valve sleeve 72 is then led through one side of the transverse retaining hole 714 of the valve body 71 till one the arc end 721 coming out of the other side of the transverse retaining hole 714 and the sealing ring 7221 abutting against the projecting flange 7143 to seal up the lower water outlet orifice 7142 and thus stop the discharge of water thereof. The switch sleeve 73 is then led to the lower end of the valve body 71 till the locating ribs 733 thereof abutting against the stop flange 713 thereof and both arc ends 721 thereof slid through the guide slope 732 thereof to be abutted against the eccentric arc facet 731 of the switch sleeve 73 thereof as shown in FIG. 4.

The pivot rod 842 of the retaining sleeve 84 is led through the pivot hole 83 of the rotary connector 8 with the sleeve seat 841 thereof engaged with the sleeve hole 82 thereof. The pivot rod 842 is then led to the water inlet hole 716 of the valve body 71 and securely fixed thereto via ultrasonic wave or fastening agents thereof. The threaded upper end 611 of the threaded sleeve 61 thereof is finally screw joined to the threaded coupling hole 51 of the brush embodiment 5 to complete the assembly of the present invention as shown in FIGS. 3, 4.

Figure 5:
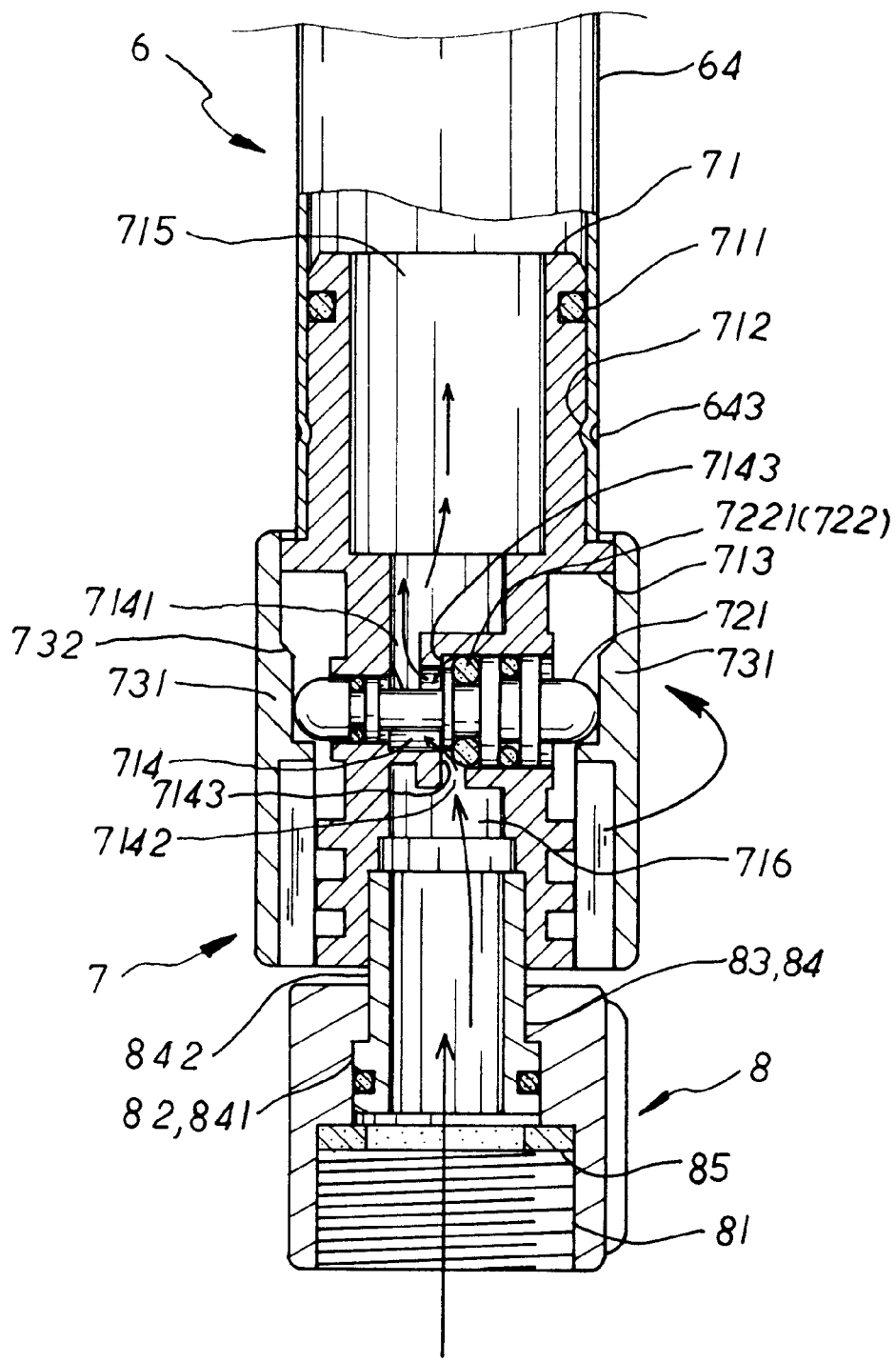
FIG. 5 is a diagram showing the discharge of water of the present invention in a partially sectional view.
Figure 6:
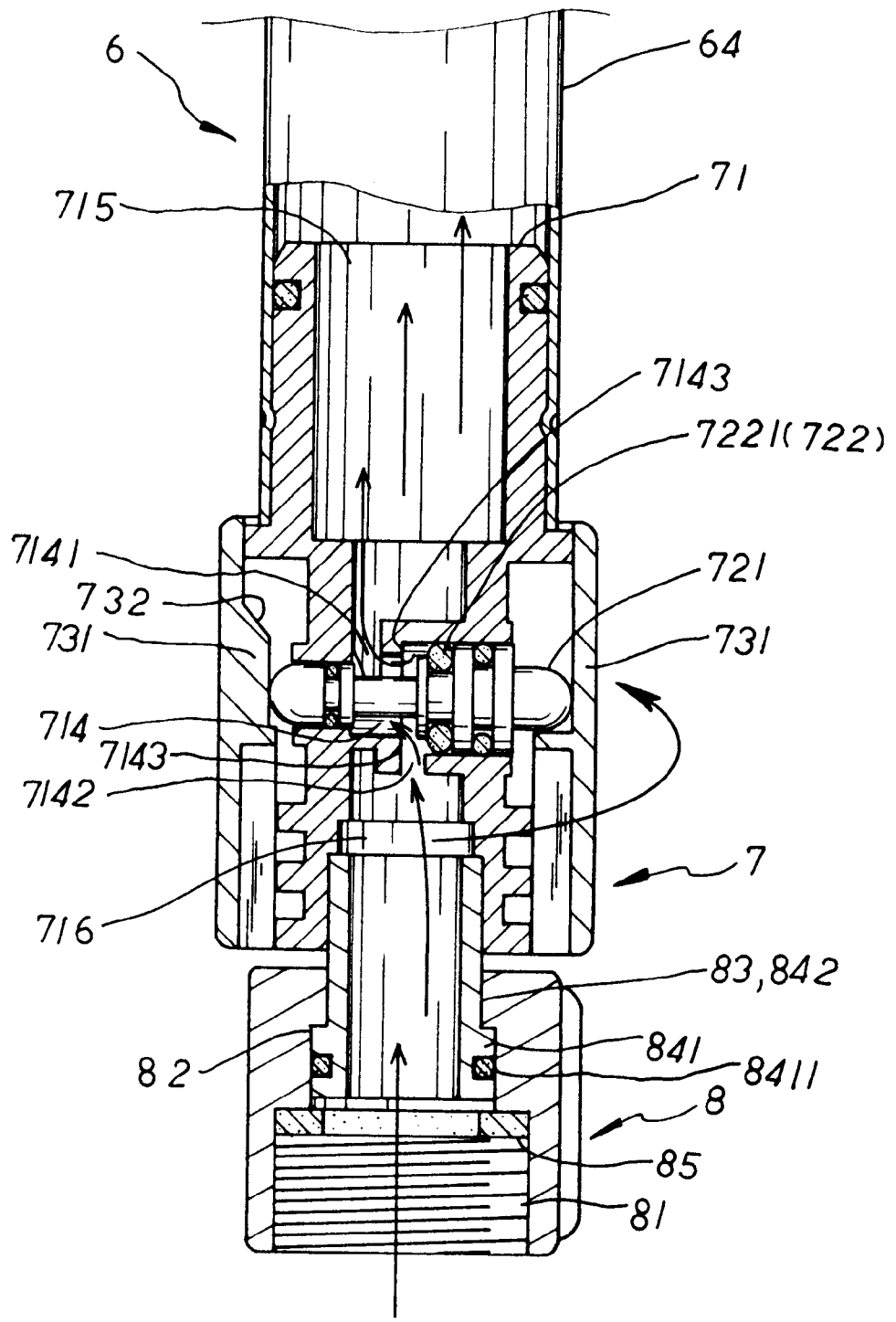
FIG. 6 is another diagram showing the discharge of water of the present invention in another partially sectional view.

Please refer to FIGS. 5, 6. Via the mechanism 6f said valve sleeve 72 adapted at the transverse retaining hole 714 of the valve body 71, the switch sleeve 73 can easily regulate the discharge of water. When abutting tight against the projecting flange 7143 of the valve body 71, the sealing ring 7221 of the valve sleeve 72 thereof will seal up the lower water outlet orifice 7142 of the valve body 71 and thus stop the discharge of water thereof. When the switch sleeve 73 is rotated to one side, the eccentric arc facet 731 of the switch sleeve 73 will push both arc ends 721 of the valve sleeve 72 to dislocate the sealing ring 7221 thereof from the projecting flange 7143 thereof, revealing a gap there-between in communication with the lower water orifice 7142 thereof for the discharge of water thereof. The water coming through the lower water inlet hole 716 will go through the valve sleeve 72, inlet via the lower water orifice 7142 and outlet via the upper water orifice 7141, to come out at the upper water outlet hole 715 thereof and flow through the telescopic tube 6 to be discharged at the brush embodiment 5 for cleaning without any interruption thereof.

Besides regulating the discharge of water, the switch sleeve 73 can also accurately control the amount of water discharge. When the gap between the sealing ring 7221 and the projecting flange 7143 is wider, the amount of water discharged will increase accordingly as shown in FIG. 6. Via the mechanism thereof, the switch sleeve 73 can directly and smoothly regulate the water discharge without wearing out any parts thereof, or producing any counter force therewith, greatly increasing the lifetime thereof.

What is claimed is:

1. A cleaning brush comprising a brush embodiment, a telescopic tube, a valve assembly, and a rotary connector wherein said brush embodiment has a threaded coupling hole disposed at the center thereof, and a through groove disposed at one lateral side thereof for a scraper strip to be adapted thereto; a water inlet control mechanism being characterized by that:

said telescopic tube, a hollow tube in shape, mainly made up of a threaded sleeve, a locking sleeve, a sleeve tube, an outer tube, an inner tube, and a sealing sleeve wherein said threaded sleeve having a threaded upper end of smaller diameter, and a sleeve coupling hole disposed at the other end thereof; said locking sleeve having an inner threaded section disposed at one end thereof with a tapered section disposed at the other end thereof; said sleeve tube having an inner ring groove properly disposed at the middle section thereof, a stepwise outer threaded section disposed at one end thereof and a plurality of stopping teeth extending upwards at a top of said stepwise outer threaded section thereof; said outer tube with said inner tube joined therein having a handle cover disposed at the outer surface thereof, and a projecting ring disposed at one end thereof; said sealing sleeve having a plurality of water proof rings disposed at the periphery thereof, a stepwise coupling tube disposed at one end thereof, and an indented groove disposed at the periphery of said stepwise coupling tube thereof;

said valve assembly mainly made up of a valve body, a valve sleeve, and a switch sleeve wherein said valve body having a plurality of watertight rings disposed at both an upper and a lower periphery thereof, a circular groove defined properly at the upper section thereof, a stop flange projecting at the middle section thereof, and a transverse retaining hole properly disposed at the lower section thereof; a pair of asymmetric upper and lower water outlet orifices being disposed at the inner side of said transverse retaining hole in communication with an upper water outlet hole and a lower water inlet hole disposed at both ends of said valve body thereof respectively; said lower water outlet orifice being defined by a projecting flange adjacent to said lower water inlet hole thereof; said valve sleeve having a pair of arc ends disposed at both sides thereof, and an indented ring groove disposed at one side thereof with a sealing ring adapted thereto; said switch sleeve being equipped with an eccentric arc facet properly disposed at the inner side thereof, and a guide slope extending at a top of said eccentric arc facet thereof;

said rotary connector having an inner threaded hole disposed at the lower section thereof with a sleeve hole and a pivot hole disposed consequently in stepwise at the top of said inner threaded hole thereof for a retaining sleeve to be led there-through; said retaining sleeve having a sleeve seat with a watertight ring adapted thereto disposed at one end thereof, and a pivot rod projecting at the other end thereof wherein a sealing washer is adapted to be abutted against said sleeve seat thereof;

in assembly, said valve sleeve of the valve assembly is adapted to the transverse retaining hole of said valve body till the sealing ring of said valve sleeve is abutted against the projecting flange of said valve body to seal up the discharge of water, and both arc ends of said valve sleeve is led through the guide slope of said switch sleeve to be located onto said eccentric arc facet thereof for regulating the water discharge;

whereby, said switch sleeve is rotated to one side to dislocate the sealing ring of said valve sleeve from the projecting flange of said valve body via said eccentric arc facet pushing said arc ends thereof to reveal a gap there-between in communication with said lower water orifice thereof for the discharge of water; when the gap thereof becomes wider, the amount of water discharged will increase accordingly; thus, via the mechanism thereof, said switch sleeve can directly regulate the discharge of water without any counter force produced therewith as well as accurately control the amount of water discharged, greatly saving the strength thereof.

2. The cleaning brush as claimed in claim 1 wherein the guide slope of proper angle is disposed extending at the top of the eccentric arc facet of said switch sleeve whereby both arc ends of said valve sleeve are led and located onto said eccentric arc facet thereof smoothly and quickly via said guide slope thereof.

* * * * *